(12) United States Patent
LeBlanc

(10) Patent No.: US 6,185,730 B1
(45) Date of Patent: Feb. 6, 2001

(54) METHOD AND APPARATUS FOR CREATING DIPPABLE BEANS IN A JAVA ENVIRONMENT

(75) Inventor: Karalee Brown LeBlanc, Austin, TX (US)

(73) Assignee: International Business Machines Corporation, Armonk, NY (US)

( * ) Notice: Under 35 U.S.C. 154(b), the term of this patent shall be extended for 0 days.

(21) Appl. No.: 09/120,471

(22) Filed: Jul. 23, 1998

(51) Int. Cl.[7] .................................................. G06F 9/45
(52) U.S. Cl. .................................................. 717/1
(58) Field of Search .................... 395/701, 702; 345/347; 709/303; 714/33; 717/1, 2

(56) References Cited

U.S. PATENT DOCUMENTS

| | | | |
|---|---|---|---|
| 5,418,964 | 5/1995 | Conner et al. | 706/316 |
| 5,598,562 | 1/1997 | Cutler et al. | 709/104 |
| 5,699,310 | 12/1997 | Garloff et al. | 717/1 |
| 5,815,709 | * 9/1998 | Waldo et al. | 712/300 |
| 5,822,587 | * 10/1998 | McDonald et all. | 717/2 |
| 5,848,236 | * 12/1998 | Dearth et al. | 714/33 |
| 5,918,052 | * 6/1999 | Kruskal et al. | 717/1 |
| 5,933,144 | * 8/1999 | Alcorn | 345/347 |

OTHER PUBLICATIONS

Grady Booch; Object Oriented Design with Applications; pp. 95–96, 114–116.
IBM, Bean Extender is rated JARS TOP 25%, http://www.alphaworks.ibm.com/tech/beanextender, Dec. 1997.*
Java Sun, Java: The First 800 Days, http://java.sun.com/events/jibe/timeline.html., Feb. 2000.*
IBM Bean Extender Guide to Features, The Dipping Framework, IBM Bean Extender Documentation Suite (http://www.alphaWorks.ibm.com/tech; file to download: extender2_0–doc.zip), Dec. 12, 1999.*
Zukowski, Introduction to the JavaBeans API, http://developer.java.sun.com/developer/...raining/Beans/JBeansAP/shortcourse.html, Jun. 1998.*
Otto Fox, BeanExtender's Dipping Technique, http://www7.software.ibm.com/vad.nsf/Dat...ment2013?OpenDocument&p=1&BCT=3&Footer=1, Sep. 1999.*

* cited by examiner

Primary Examiner—Tariq R. Hafiz
Assistant Examiner—Hoang-Vu Antony Nguyen-Ba
(74) Attorney, Agent, or Firm—Duke W. Yee; David A. Mims

(57) ABSTRACT

The present invention provides a method and apparatus for creating objects in an object-oriented environment, such as Java. An interface is selected for and along with an implementation object. The interface and the implementation object are morphed to create a dippable object in a new class that includes the selected interface. The dippable object is able to accept new behaviors though dips. The dippable object calls an instance of the implementation object in response to calls made to the interface.

23 Claims, 3 Drawing Sheets

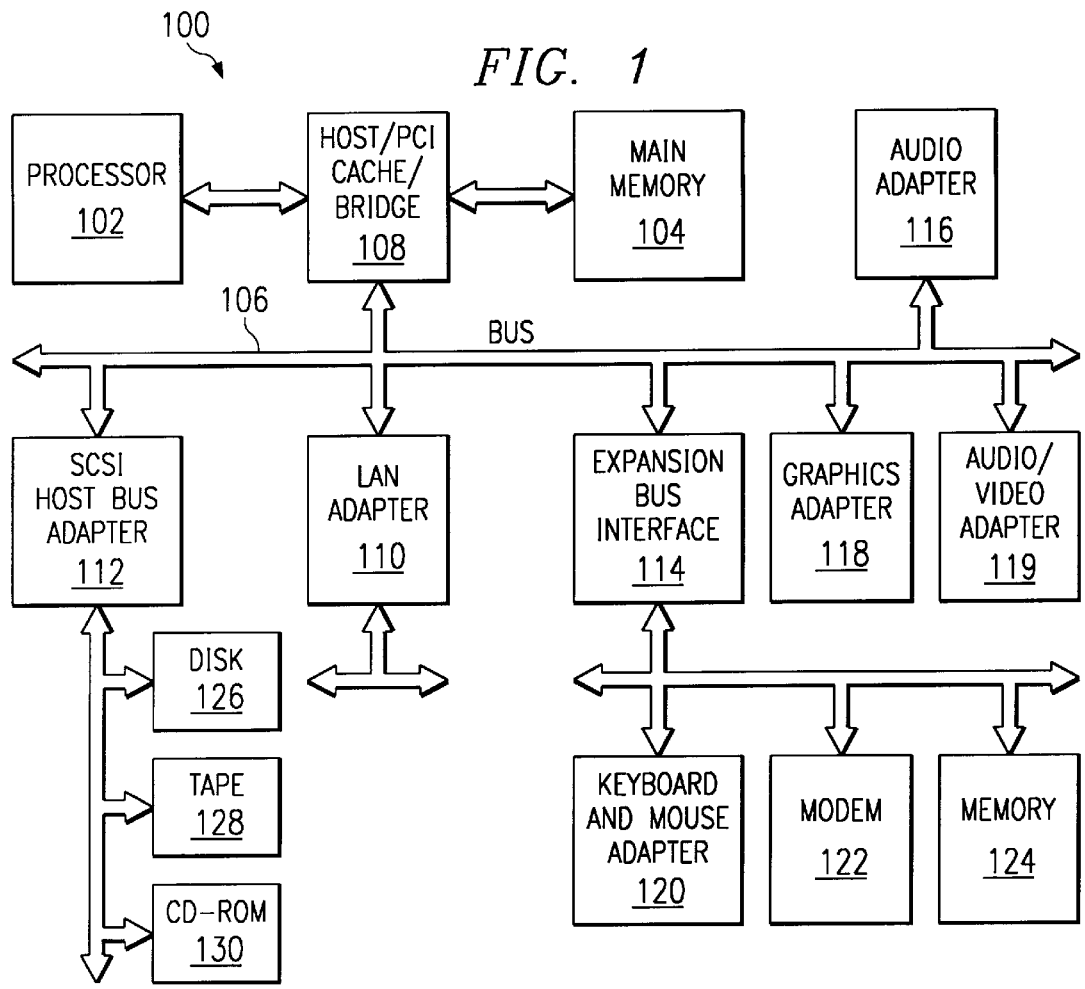
FIG. 1
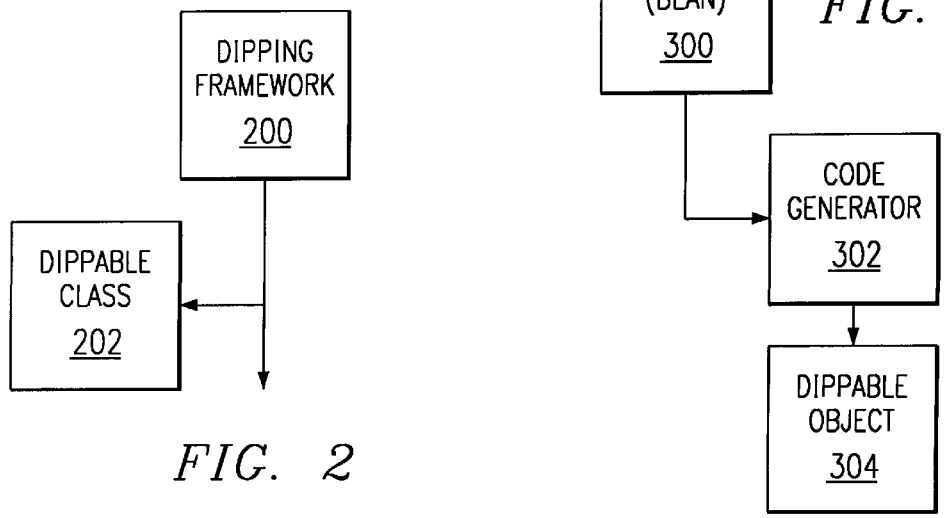
FIG. 2
FIG. 3A

METHOD AND APPARATUS FOR CREATING DIPPABLE BEANS IN A JAVA ENVIRONMENT

CROSS-REFERENCE TO RELATED APPLICATION

The present invention is related to an application entitled "An Object Oriented Programming System With Objects For Dynamically Connecting Functioning Programming Objects With Objects For General Purpose Operation", LeBlanc et al., Ser. No. 08/953,345, filed Oct. 17, 1997, assigned to a common assignee, which is incorporated herein by reference.

BACKGROUND OF THE INVENTION

1. Technical Field

The present invention relates to an improved data processing system and in particular to object-oriented programming systems. Still more particularly, the present invention relates to a method and apparatus creating Java Beans.

2. Description of Related Art

A computer includes both a physical machine, namely the hardware, and the instructions which cause the physical machine to operate, namely the software. Software includes both application and operating system programs. If the program is simply to do tasks for a user, such as solving specific problems, it is referred to as application software. If a program controls the hardware of the computer and the execution of the application programs, it is called operating system software. System software further includes the operating system, the program that controls the actual computer or central processing unit (CPU), and device drivers that control the input and output devices (I/O) such as printers and terminals.

A number of application programs are usually present waiting to use the CPU. The operating system determines which program will run next, how much of the CPU time it will be allowed to use, and what other computer resources the application will be allowed to access and use. Further, each application program will require a special input or output device and the application program must transfer its data to the operating system, which controls the device drivers.

A network containing a number of computers may be formed by having these computers, also referred to as "nodes" or "network computers", communicate with each other over one or more communications links, which is an aggregation which is a computer network. Today, many computer workstations are connected to other workstations, file servers, or other resources in a network. Each computer on a network is connected to the network via an adapter card or other similar means, which provides an ability to establish a communications link to the network.

Programs are often sent to a computer from the server. Java programs are becoming increasingly more prevalent as the type of program sent between server and client computers. Java programs are common on the Internet and becoming more increasingly common in intranets and in other types of networks used in businesses.

Java is an object oriented programming language and environment focusing on defining data as objects and the methods that may be applied to those objects. Java supports only a single inheritance, meaning that each class can inherit from only one other class at any given time. While Java only allows a class to inherit from a single class, that class can implement multiple interfaces. Java also allows for the creation of totally abstract classes known as interfaces, which allow the defining of methods that may be shared with several classes without regard for how other classes are handling the methods.

Java object may be changed to create new classes and given new behavior in addition to the behavior obtained though inheritance. In some cases, creation of objects through inheritance does not provide the desired flexibility. For example, inheritance in some cases exposes too much of the original object's methods, which may pose a security issue.

Therefore, it would be advantageous to have an improved method and apparatus for creating objects with increased flexibility.

SUMMARY OF THE INVENTION

The present invention provides a method and apparatus for creating objects in an object-oriented environment, such as Java. An interface is selected for and along with an implementation object. The interface and the implementation object are morphed to create a dippable object in a new class that includes the selected interface. The dippable object is able to accept new behaviors through dips. The dippable object calls an instance of the implementation object in response to calls made to the interface.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a block diagram of a data processing system in which the present invention may be implemented is illustrated;

FIG. 2 is a diagram of a dipping framework in accordance with a preferred embodiment of the present invention;

FIG. 3A is a diagram of process for generating a dippable object using inheritance in accordance with a preferred embodiment of the present invention;

DETAILED DESCRIPTION OF THE PREFERRED EMBODIMENT

Figure 3B:
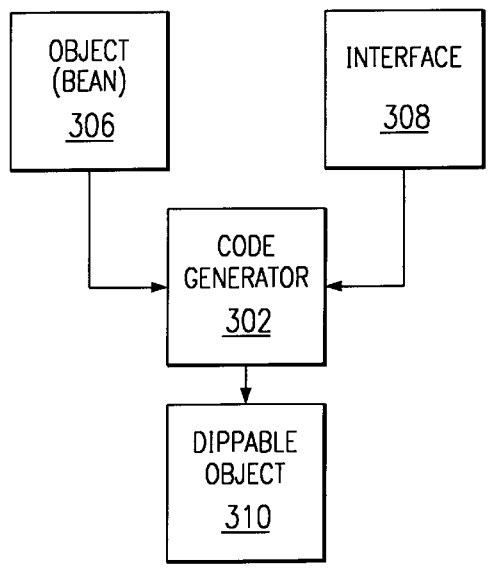
FIG. 3B is a diagram of process for generating a dippable object using aggregation in accordance with a preferred embodiment of the present invention.

With reference now to the figures and in particular with reference to FIG. 1, a block diagram of a data processing system 100 in which the present invention may be implemented is illustrated. Data processing system 100 may be used either as a server or a computer. Data processing system 100 employs a peripheral component interconnect (PCI) local bus architecture. Although the depicted example employs a PCI bus, other bus architectures such as Micro Channel and ISA may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, SCSI host bus adapter 112, and expansion bus interface 114 are connected to PCI local bus 106 by direct component connection. In contrast, audio adapter 116, graphics adapter 118, and audio/video adapter (A/V) 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM 130 in the depicted example. Typical PCI local bus implementations will support three or four PCI expansion slots or add-in connectors.

An operating system runs on processor 102 and is used to coordinate and provide control of various components within data processing system 100 in FIG. 1. The operating system may be commercially available operating system such as OS/2, which is available from International Business Machines Corporation. "OS/2" is a trademark of from International Business Machines Corporation. An object oriented programming system such as Java may run in conjunction with the operating system and provides calls to the operating system from Java programs or applications executing on data processing system 100. Instructions for the operating system, the object-oriented operating system, and applications or programs are located on storage devices, such as hard disk drive 126 and may be loaded into main memory 104 for execution by processor 102

Those of ordinary skill in the art will appreciate that the hardware in FIG. 1 may vary depending on the implementation. For example, other peripheral devices, such as optical disk drives and the like may be used in addition to or in place of the hardware depicted in FIG. 1. The depicted example is not meant to imply architectural limitations with respect to the present invention. For example, the processes of the present invention may be applied to multiprocessor data processing system.

The present invention provides a method, data processing system, and instructions for creating dippable Java Beans using either inheritance or aggregation, rather than just inheritance alone. A preferred embodiment of the present invention also provides processes used in a code generator to create a dippable Java Bean using an interface and a Java Bean Turning now to FIG. 2, a diagram of a dipping framework is depicted in accordance with a preferred embodiment of the present invention. Dipping framework 200 is used by dippable class 202. A dippable class can be created two ways: either through inheritance or aggregation. Dipping framework 200 may be found in IBM BeanExtender technology available from International Business Machines Corporation. Dipping framework 200 takes an original class and employs a morphing process to create a new dippable class 202 where all methods a bound and constrained. The only classes that are allowed to bind or constrain the dippable class 202 through dips, which are classes that include an interface that allows interaction with dippable classes. This mechanism allows new behaviors or functions to be applied to a dippable class though dips. Any Java class may be made dippable. The depicted examples below are directed towards making dippable Java Beans. "Java Bean" is a trademark of Sun Microsystems, Inc. Dips in the depicted examples are beans that react to state changes in dippable beans to which the dips are attached. Dips modify the runtime behavior of beans to which they are attached, but do not provide new interfaces on beans to which they are attached.

With reference now to FIG. 3A, a diagram of process for generating a dippable object using inheritance is depicted in accordance with a preferred embodiment of the present invention. A morphing operation is applied to object 300 using code generator 302 to create a new dippable object 304 through inheritance. In the depicted example, object 300 is a Java Bean, which when morphed by code generator 302 results in a dippable Java Bean, dippable object 304. Morphing is the term used to describe the creation of a new dippable class from an existing class. This dippable object is basically object 300 with modifications in the form of an interface that allow it to accept additional behavior from a dip, which is an object with an interface that provides for interaction with interface in dippable object 304. In essence, dippable object 304 looks and behaves like object 300, but has the added ability to accept behavioral modification components. With inheritance, an existing class is morphed to create a new dippable class as a child of the original class. From this new class definition a dippable object may be instantiated.

Turning now to FIG. 3B, a diagram of process for generating a dippable object using aggregation is depicted in accordance with a preferred embodiment of the present invention. Code generator 302 generates dippable object 310 through aggregation. Object 306 and interface 308 are used by code generator 302 to create dippable object 310. With aggregation, an interface and a corresponding implementation of the class is used to create a new dippable class that implements the interface and using a selected object, also referred to as an "implementation object". This implementation object is an object that "implements" or has the interface selected for creating dippable object 310. This dippable object is not a child of the implementation object, object 306.

Both dippable classes created using inheritance and aggregation implement a dippable interface that allows addition of one or more dips.

Figure 4:
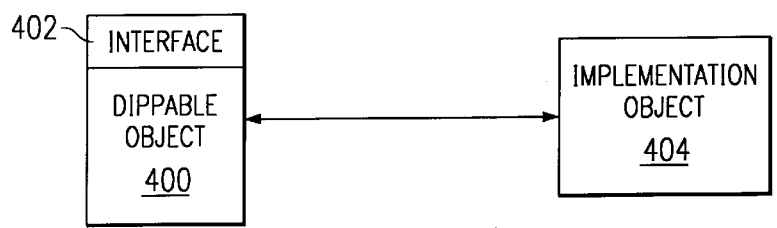
FIG. 4 is a diagram of the message flow for a dippable object created through aggregation is depicted in accordance with a preferred embodiment of the present invention.

Turning now to FIG. 4, a diagram of the message flow for a dippable object created through aggregation is depicted in accordance with a preferred embodiment of the present invention. Dipping is the ability to add behaviors to existing dippable classes through dips. Dippable object 400 implements an interface 402 used to interact with other objects. Another interface (not shown) is employed to allow for the addition of dips. Interface 402 is the interface used in creating dippable object 400. The method or methods within dippable object does not provide the functions described by interface 402. Instead, the method or methods within dippable object 400 make calls to implementation object 404, which is an instance of an object in the class of objects selected for use in creating dippable object 400. Implementation object 404 returns a response to dippable object 400, which may be returned to the caller.

For example, if the interface selected for aggregation is "Pets" with a method called "MakeNoise" and the implementation object is in the class of "Dogs", the resulting dippable object will be in a new class implementing the interface "Pets" and the method "MakeNoise" will send a call to an instance of an object in the class "Dogs". A call to the dippable object will result in a call made to the implementation object in the class "Dogs". If the result from "MakeNoise" returned to the dippable object is "Bark", this result may be returned by the dippable object to the calling object. The calling object does not know that the function was not performed within the dippable object. This dippable object may have behavior modifications through the addition of dips.

In essence, dippable object 400 delegates the responsibility for providing the function to implementation object 404. Such a delegation also provides for increased security because an examination of dippable object 400 does reveal the methods used by interface 402.

Figure 5:
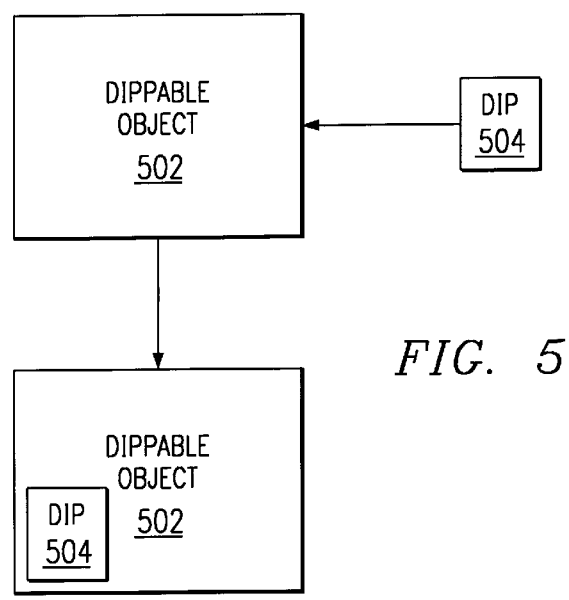
FIG. 5 is a diagram of a dipping process in accordance with a preferred embodiment of the present invention.

With reference now to FIG. 5, a diagram of a dipping process is depicted in accordance with a preferred embodiment of the present invention. After an object has been made dippable, behavior modifications may be made by calling the Add Dip method which is on every dippable object. Dippable object 502 takes dip 504 and adds dip 504 to its list of attached dips. Dip 504 encapsulates behavior that is to be added to dippable object 502. In addition, dip 504 controls dippable object 502 with respect to the added behavior.

Morphing and dipping are both used to modify a program to add or modify behavior of the object. In addition, added or modified behavior may be easily removed at a later time by removing the dip. Morphing is a means by which a new dippable class is created from an existing class, or an existing class plus an interface. In the new dippable class, all methods, events, and properties of the original class can have "before" and "after" notifications performed. In addition, any "before" notification can also veto the execution of the method, property, or event. This mechanism is handled by applying a dip to the dippable class created by the morphing process. The dip then uses the "before" and "after" notifications to modify the behavior of the dippable class. More information on morphing and dipping objects are found in assignee's co-pending U.S. Patent Application entitled "An Object Oriented Programming System With Objects For Dynamically Connecting Functioning Programming Objects With Objects For General Purpose Operation", LeBlanc et al., Ser. No. 08/953,345, filed Oct. 17, 1997. In this application "morphing" is described as a process for creating hooks in a connecting object which fires events to notify interested object. Morphing is the means by which an original general purpose Bean is extended using a connecting layer to hook the original Bean's property changes, event generation, and method calls and notify any interested context layer objects (dips) to produce a dippable general purpose Bean.

Figure 6:
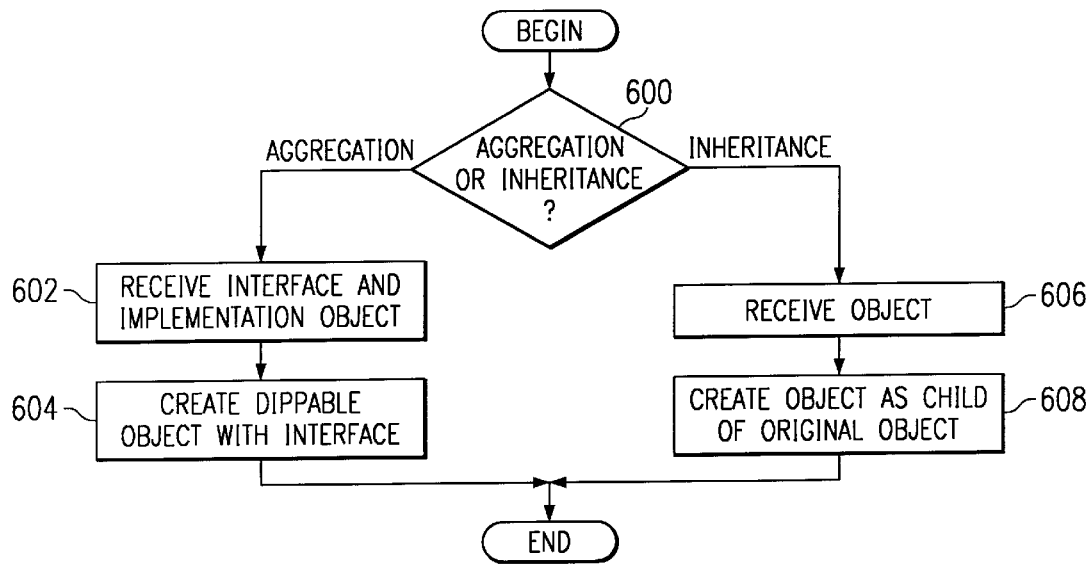
FIG. 6 is a flowchart of a process for creating dippable objects in accordance with a preferred embodiment of the present invention.

Turning now to FIG. 6, a flowchart of a process for creating dippable objects is depicted in accordance with a preferred embodiment of the present invention. This process is implemented by code generator, which is in a Dippable-Generator class which is found in the dipping framework in the depicted examples. The process is shown with respect to a Java bean, but can be applied to any type of object in an object-oriented environment.

The process begins by determining whether the input indicates that inheritance or aggregation is to be used to create a dippable bean (step 600). In the depicted example, the input to the process may be a string containing the name of a bean or a string containing the name of an interface and a corresponding implementation bean. If the input is just the name of a bean, inheritance is to be used. An input including the name of an interface and a corresponding implementation bean indicates that aggregation is to be used in creating a dippable bean.

If the input indicates that aggregation is to be used, the name of the interface and the name of the corresponding implementation bean are received (step 602). Thereafter, a bean object is created using the inputs (step 604). The bean object created in step 604 implements the interface named in the string as well as a dippable bean interface. The bean includes a reference to the implementation bean named in the string. The dippable bean is not a subclass of the implementation bean. Instead the dippable bean implements the interface named in the input and uses the implementation object. The process terminates thereafter.

Returning to step 600, if the input indicates that inheritance is to be used in generating a dippable bean, the process then receives the name of the bean object in the input (step 606) and creates a bean object as a child of the original bean (step 608). In step 608, the process creates a class reference and, using introspection, produces a subclass of the bean object which implements the dippable interface. The process terminates thereafter.

Figure 7:
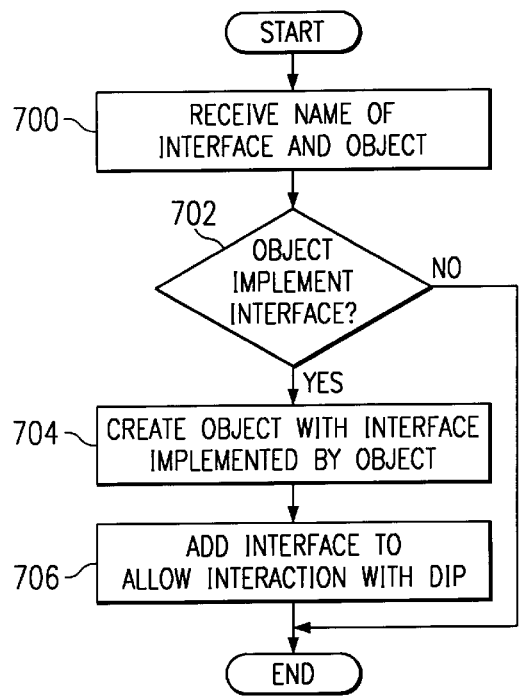
FIG. 7 is a high level flowchart of a process for creating a dippable object through aggregation in accordance with a preferred embodiment of the present invention.

With reference now to FIG. 7, a high level flowchart of a process for creating a dippable object through aggregation is depicted in accordance with a preferred embodiment of the present invention. The process begins by receiving a name of the interface and the object (step 700). A determination is made as to whether the object implements the named interface (step 702). If the object does not implement the interface, the process terminates. Otherwise, a new object is created with the named interface implemented by the object (step 704). Another interface is added to the new object to allow interaction with dips (step 706). This new object is part of the dippable class and is not a child of the object named in step 700.

Thus, the present invention provides a flexible mechanism to create objects through both inheritance and aggregation. In addition with aggregation, increased security is provided by exposing only the methods in the interface and not every method in the class. The processes provided a dippable object that can delegate functions to instances of objects used to create the dippable object though aggregation.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not limited to be exhaustive or limited to the invention in the form disclosed. Many modifications and variations will be apparent to those of ordinary skill in the art. For example, the present invention may be applied to object-oriented environments other than Java. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for creating a dippable object, the method comprising:

receiving an interface;

receiving an identification of an object, wherein the object implements the interface; and creating a dippable object, wherein the dippable object is unrelated to the object, wherein the dippable object incorporates the interface, and wherein calls made to the dippable object through the interface are routed to an instance of the object.

2. The method of claim 1, wherein a method is created for the dippable object in the creating step in which calls made to the interface invoke the method, which sends the call to the instance of the object and receives a response from the instance of the object.

3. The method of claim 1, wherein the object is a Java object.

4. The method of claim 3, wherein the Java object is a Java bean.

5. A method for generating an object in a computer having an object oriented programming system, the method comprising the computer implemented steps of:

identifying an first interface;

identifying an object implementing the first interface; and creating a new object, wherein the new object includes the first interface and a second interface in which the second interface is employed by the new object to notify a second object of an occurrence of a selected condition and in which calls made to the first interface are sent to the object implementing the first interface.

6. The method of claim 5, wherein the new object is a Java bean.

7. The method of claim 5, wherein the second object is a dip.

8. The method of claim 5, wherein the object oriented programming system is Java.

9. A code generator in a computer readable medium having a plurality of modes of operation including:

a first mode of operation, responsive to identifying an object in which the code generator creates a first type of dippable object using inheritance; and a second mode of operation, responsive to identifying an interface and an implementation object, in which the code generator creates a second type of dippable object using aggregation.

10. The code generator of claim 9, wherein the object is identified in the second mode of operation by receiving a name of the object.

11. The code generator of claim 9, wherein the interface and the implementation object are identified in the second mode of operation by receiving a name of the interface and a name of the implementation object.

12. The code generator of claim 9, wherein the object is a Java bean.

13. A data processing system for creating a dippable object, the data processing system comprising:

first reception means for receiving an identification of an interface;

second reception means for receiving an identification of an object, wherein the object implements the interface; and creating a dippable object, wherein the dippable object is unrelated to the object and wherein the dippable object incorporates the interface and wherein calls made to the dippable object through the interface are routed an instance of the object.

14. The data processing system of claim 13, wherein a method is created for the dippable object in the creating step in which calls made to the interface invoke the method, which sends the call to the instance of the object and receives a response from the instance of the object.

15. The data processing system of claim 13, wherein the object is a Java bean.

16. A data processing system for generating an object in an object oriented programming system located in the data processing system, the data processing system comprising:

first identification means for identifying an first interface;

second identification means for identifying an object implementing the first interface; and creation means for creating a new object, wherein the new object includes the first interface and a second interface in which the second interface is employed by the new object to notify a second object of an occurrence of a selected condition and in which calls made to the first interface are sent to the object implementing the first interface.

17. The data processing system of claim 16, wherein the new object is a bean.

18. The data processing system of claim 16, wherein the second object is a dip.

19. The data processing system of claim 16, wherein the object oriented programming system is Java.

20. A computer program product for creating an object in an object oriented programming system, the computer program product comprising:

a computer readable medium;

first instructions for identifying an first interface;

second instructions for identifying an object implementing the first interface; and third instructions for creating a new object, wherein the new object includes the first interface and a second interface in which the second interface is employed by the new object to notify a second object of an occurrence of a selected condition and in which calls made to the first interface are sent to the object implementing the first interface, wherein the instructions are embodied within the computer readable medium.

21. The computer program product of claim 20, wherein the computer readable medium is a CD-ROM.

22. The computer program product of claim 20, wherein the computer readable medium is a communications link.

23. The computer program product of claim 20, wherein the computer readable medium is a random access memory.

* * * * *